(12) United States Patent
Sammak

(10) Patent No.: US 12,234,750 B1
(45) Date of Patent: Feb. 25, 2025

(54) SYSTEMS FOR IMPROVING COMBINED CYCLE POWER PLANT STEAM INTEGRATION WITH POST COMBUSTION CARBON CAPTURE

(71) Applicant: GE Infrastructure Technology LLC, Schenectady, NY (US)

(72) Inventor: Majed Sammak, Schenectady, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/723,727

(22) PCT Filed: Dec. 29, 2021

(86) PCT No.: PCT/US2021/065455
§ 371 (c)(1),
(2) Date: Jun. 24, 2024

(87) PCT Pub. No.: WO2023/129149
PCT Pub. Date: Jul. 6, 2023

(51) Int. Cl.
*F01K 23/10* (2006.01)
*F01K 17/06* (2006.01)
*F02C 6/18* (2006.01)

(52) U.S. Cl.
CPC .............. *F01K 23/10* (2013.01); *F01K 17/06* (2013.01); *F02C 6/18* (2013.01)

(58) Field of Classification Search
CPC ........ F01K 23/10; F01K 17/06; F01K 25/103; F02C 6/18
See application file for complete search history.

(56) References Cited

U.S. PATENT DOCUMENTS

| | | | |
|---|---|---|---|
| 11,833,467 B2* | 12/2023 | Tsutsumi | B01D 53/1412 |
| 2011/0232286 A1* | 9/2011 | Mishima | F01K 13/00 122/367.1 |
| 2011/0277981 A1 | 11/2011 | Muthuramalingam | |
| 2012/0006200 A1 | 1/2012 | Mazumdar et al. | |
| 2013/0199151 A1* | 8/2013 | Majumdar | F01K 17/04 60/39.182 |
| 2013/0247766 A1 | 9/2013 | Oppenheim et al. | |
| 2018/0339265 A1* | 11/2018 | Elliott | B01D 53/346 |
| 2020/0368674 A1* | 11/2020 | Tanaka | B01D 53/18 |
| 2021/0079823 A1 | 3/2021 | Tsujiuchi et al. | |

* cited by examiner

*Primary Examiner* — Jesse S Bogue
(74) *Attorney, Agent, or Firm* — Armstrong Teasdale LLP

(57) ABSTRACT

A system for improving steam integration of a combined cycle (CC) power plant. A heat recovery steam generator (HRSG) receives exhaust gases from a gas turbine and discharges steam to a steam turbine. A dual reboiler arrangement includes a first reboiler and a second reboiler, the first reboiler receiving steam discharged from the steam turbine and using heat extracted from the received steam to heat a solvent circulated by a carbon capture arrangement, and the second reboiler channeling steam into the first reboiler for use in heating. A steam ejector receives an external flow, and mixes the external flow with steam from the steam turbine. A flash drum recovers excess steam from the first reboiler and discharges a portion of the recovered excess steam to a steam cycle arrangement including the HRSG and the steam turbine.

10 Claims, 2 Drawing Sheets

SYSTEMS FOR IMPROVING COMBINED CYCLE POWER PLANT STEAM INTEGRATION WITH POST COMBUSTION CARBON CAPTURE

BACKGROUND

The present disclosure relates generally to combined cycle power plants and, more specifically, to systems for improving steam integration for use with post combustion carbon capture.

At least some known power plants generate energy derived from combusting carbon and hydrogen-containing fuels such as, coal, oil, peat, waste, biofuel, natural gas, and the like. In addition to carbon and hydrogen, such fuels may contain oxygen, moisture, and/or contaminants. As such, the combustion of such fuels may result in the production of a gas stream containing contaminants in the form of ash, carbon dioxide ($CO_2$), sulfur compounds (often in the form of sulfur oxides, referred to as "SOx"), nitrogen compounds (often in the form of nitrogen oxides, referred to as "NOx"), chlorine, mercury, and other trace elements.

At least some known power plants may use capture systems to facilitate removing the contaminants from the gas stream, prior to an exhaust stream being released into the atmosphere. For example, some known power plants use carbon capture systems that attempt to capture carbon dioxide ($CO_2$) post combustion and store it underground to reduce an amount released into the atmosphere. However, the process of carbon capture may decrease the overall efficiency and limit the power production of the power plant due to the power required for the carbon capture process. Thus, at least some of such power plant systems operate at a decreased power production efficiency.

Accordingly, it would be desirable to improve the steam integration of power plant systems with post combustion carbon capture. Improving the steam integration may facilitate reducing the power plant power production efficiency penalties from using post combustion carbon capture by increasing the amount of power generated by the steam turbine.

BRIEF DESCRIPTION

In one aspect, a combined cycle power plant is provided. The power plant includes a steam cycle arrangement, including a heat recovery steam generator (HRSG) and a steam turbine. The HRSG includes an HRSG inlet oriented to receive exhaust gases from a gas turbine, and a first HRSG outlet oriented to discharge a first steam flow. A dual reboiler arrangement includes a first reboiler and a second reboiler. The first reboiler is coupled in flow communication with the first HRSG outlet and is configured to heat a circulation flow discharged from a steam turbine and use the heat extracted from the circulation flow to heat a solvent circulated by a carbon capture arrangement. The second reboiler is oriented to receive a first portion of a discharge liquid flow from the carbon capture arrangement and is configured to preheat the first portion using heat extracted from an external flow received from a first external source, and channel the preheated first portion into the first reboiler for use in heating.

In another aspect, a combined cycle power plant is provided. The power plant includes a steam cycle arrangement, including a heat recovery steam generator (HRSG) and a steam turbine. The HRSG includes an HRSG inlet oriented to receive exhaust gases from a gas turbine, and a first HRSG outlet oriented to discharge a first steam flow. A dual reboiler arrangement includes a first reboiler and a second reboiler. The first reboiler is coupled in flow communication with the first HRSG outlet and is configured to heat a circulation flow discharged from a steam turbine and use the heat extracted from the circulation flow to heat a solvent circulated by a carbon capture arrangement. The second reboiler is oriented to receive a first portion of a discharge liquid flow from the carbon capture arrangement and is configured to preheat the first portion using heat extracted from an external flow received from a first external source, and channel the preheated first portion into the first reboiler for use in heating. The power plant also includes a steam ejector coupled in flow communication between the first HRSG outlet and the first reboiler, the steam ejector configured to receive a second external source fluid flow and mix the circulation flow and the second external source fluid flow. The power plant also includes a flash drum coupled in downstream flow communication with the first reboiler, the flash drum configured to recover excess steam from the first reboiler and discharge a portion of the recovered excess steam to the steam cycle arrangement.

DETAILED DESCRIPTION

The embodiments described herein relate to systems for improving steam integration of a combined cycle power plant for use with post combustion carbon capture. Specifically, the systems described herein use a dual reboiler arrangement, a steam ejector, and a flash drum to facilitate reducing the effects of efficiency penalties and power reduction associated with operating the carbon capture process. More specifically, the dual reboiler arrangement and the steam ejector facilitate increasing the amount of power generated by the steam turbine by reducing an amount of steam extracted from the steam turbine. Moreover, the flash drum facilitates increasing the amount of power generated by the steam turbine by recovering steam used in the carbon capture process, and returning the recovered steam to the steam turbine.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
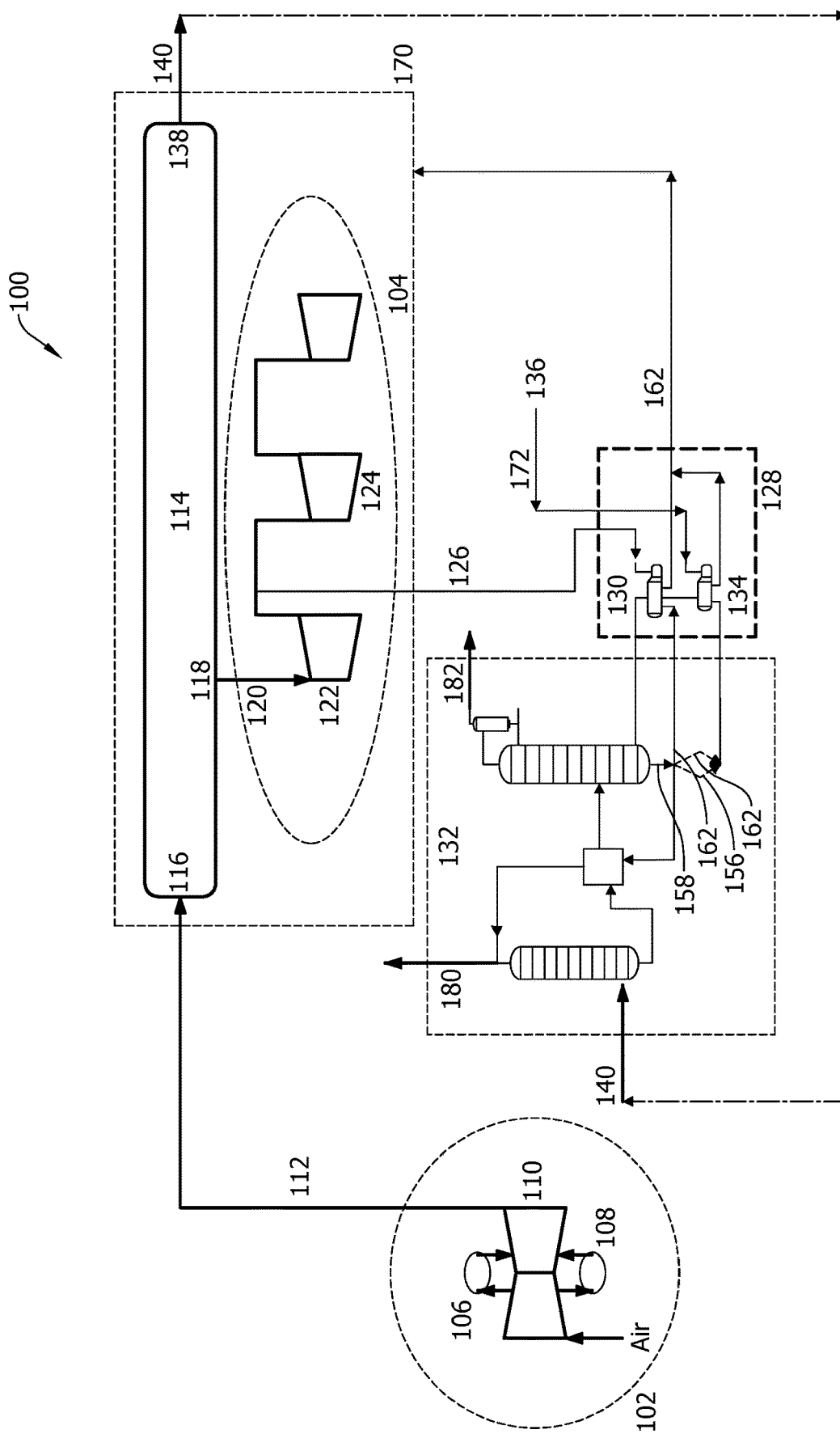
FIG. 1 is a schematic illustration of an exemplary combined cycle power plant.

FIG. 1 is a schematic illustration of an exemplary combined cycle power plant 100. In the exemplary embodiment, power plant 100 includes a gas turbine 102 and a steam turbine 104. The gas turbine 102 includes a compressor section 106, a combustor 108, and a turbine section 110 coupled together in a serial flow relationship. In operation, combustor 108 receives air from compressor section 106 and fuel from a fuel supply and uses the fuel and air to create a fuel-air mixture that is combusted to generate combustion gases. Combustion gases are channeled through the turbine section 110 and discharged from the turbine section 110 as an exhaust gas stream 112. In the exemplary embodiment, power plant 100 also includes a steam cycle arrangement 170. The steam cycle arrangement 170 includes a Heat Recovery Steam Generator (HRSG) 114 and the steam turbine 104. In some embodiments, the steam cycle arrangement 170 may also include other components, including a condenser (not shown) and at least one circulation pump (not shown). HRSG 114 includes an HRSG inlet 116 oriented to receive exhaust gas stream 112 from the gas turbine 102, a first HRSG outlet 118 oriented to discharge a first steam flow 120, and a second HRSG outlet 138 to discharge an exhaust gas flow 140. The steam turbine 104 includes an intermediate pressure steam turbine 122 that receives the first steam flow 120 and a low pressure steam turbine 124 downstream from the intermediate pressure steam turbine 122. The steam turbine 104 discharges a circulation flow 126, and in some embodiments, the steam turbine 104 may include additional pressure steam turbines downstream from the low pressure steam turbine 124.

In the exemplary embodiment, power plant 100 also includes a dual reboiler arrangement 128. The dual reboiler arrangement 128 includes a first reboiler 130 that receives the circulation flow 126 and uses heat extracted from the circulation flow 126 to heat a solvent circulated in a carbon capture arrangement 132. The dual reboiler arrangement 128 further includes a second reboiler 134 that receives a first portion 156 of a discharge liquid flow 158 from the carbon capture arrangement 132, preheats the first portion 156 using heat extracted from an external flow 172 received from a first external source 136, and channels the preheated first portion 156 into the first reboiler 130 for use in heating. The external flow 172 may be liquid or gas. In some embodiments, the first portion 156 may be preheated using heat extracted from a source internal to power plant 100. The first reboiler 130 and second reboiler 134 also receive a second portion 162 of a discharge liquid flow 158 from the carbon capture arrangement 132, and discharge the second portion 162 to the steam cycle arrangement 170. The HRSG 114 discharges the exhaust gas flow 140 to the carbon capture arrangement 132 via the second HRSG outlet 138. The exhaust gas flow 140 includes a plurality of exhaust gases and a carbon dioxide gas. The carbon capture arrangement 132 separates the plurality of exhaust gases from the carbon dioxide gas. The carbon capture arrangement 132 then discharges the plurality of exhaust gases via a first carbon capture arrangement outlet 180 and discharges the carbon dioxide gas via a second carbon capture arrangement outlet 182.

During use, the dual reboiler arrangement 128 facilitates increasing the amount of power generated by the steam turbine 104, by reducing an amount of steam extracted from the steam turbine 104.

Figure 2:
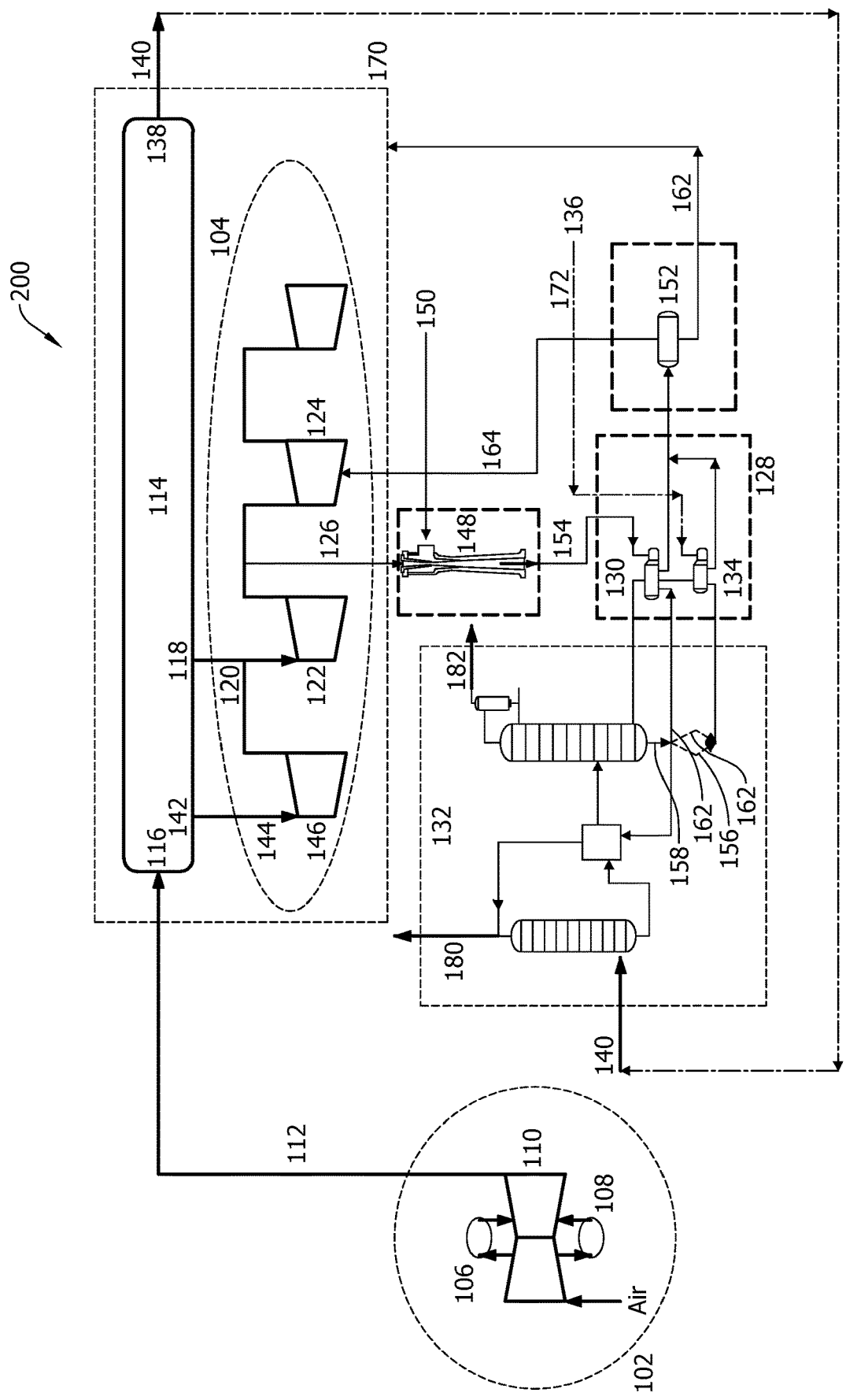
FIG. 2 is a schematic illustration of an alternative combined cycle power plant.

FIG. 2 is a schematic illustration of an alternative embodiment of a combined cycle power plant 200. In the alternate embodiment, power plant 200 includes a gas turbine 102 and a steam turbine 104. The gas turbine 102 includes a compressor section 106, a combustor 108, and a turbine section 110 coupled together in a serial flow relationship. In operation, combustor 108 receives air from compressor section 106 and fuel from a fuel supply and uses the fuel and air to create a fuel-air mixture that is combusted to generate combustion gases. Combustion gases are channeled through the turbine section 110 and discharged from the turbine section 110 as an exhaust gas stream 112. Power plant 200 further includes a steam cycle arrangement 170. The steam cycle arrangement includes a Heat Recovery Steam Generator (HRSG) 114 and the steam turbine 104. In some embodiments, the steam cycle arrangement 170 may also include other components, including a condenser (not shown) and at least one circulation pump (not shown). HRSG 114 includes an HRSG inlet 116 oriented to receive exhaust gas stream 112 from the gas turbine 102, a first HRSG outlet 118 oriented to discharge a first steam flow 120, a second HRSG outlet 138 that discharges an exhaust gas flow 140, and a third HRSG outlet 142 that discharges a second steam flow 144. The steam turbine 104 includes a high pressure steam turbine 146 that receives the second steam flow 144, an intermediate pressure steam turbine 122 downstream from the high pressure steam turbine 146 that receives the first steam flow 120, and a low pressure steam turbine 124 downstream from the intermediate pressure steam turbine 122. The steam turbine 104 discharges a circulation flow 126. In some embodiments, the steam turbine 104 may include additional pressure steam turbines downstream from the low pressure steam turbine 124.

The alternative embodiment shown in FIG. 2 also includes a steam ejector 148 that receives the circulation flow 126 and a fluid flow from a second external source 150. The circulation flow 126 is mixed with the fluid flow from the second external source 150 prior to a steam mixture 154 being discharged from the steam ejector 148.

In addition, the alternative embodiment includes a dual reboiler arrangement 128 downstream from the steam ejector 148. The dual reboiler arrangement 128 includes a first reboiler 130 that receives the steam mixture 154 discharged from the steam ejector 148 and uses heat extracted from the steam mixture 154 to heat a solvent circulated in a carbon capture arrangement 132. The dual reboiler arrangement 128 also includes a second reboiler 134 that receives a first portion 156 of a discharge liquid flow 158 from the carbon capture arrangement 132. The second reboiler 134 preheats the first portion 156 using heat extracted from an external flow 172 received from a first external source 136, and channels the preheated first portion 156 into the first reboiler 130 for use in heating. The external flow 172 may be liquid or gas. In some embodiments, the first portion 156 may be preheated using heat extracted from a source internal to power plant 100.

The alternative embodiment also includes a flash drum 152 downstream from the dual reboiler arrangement 128. The first reboiler 130 and second reboiler 134 receive a second portion 162 of a discharge liquid flow 158 from the carbon capture arrangement 132 and discharge the second portion 162 to the flash drum 152. The flash drum 152 discharges a recovered steam flow 164 to the low pressure steam turbine 124 of the steam turbine 104. Moreover, the flash drum 152 also discharges the second portion 162 to the steam cycle arrangement 170. The HRSG 114 discharges the exhaust gas flow 140 to the carbon capture arrangement 132 via the second HRSG outlet 138. The exhaust gas flow 140 includes a plurality of exhaust gases and a carbon dioxide gas. The carbon capture arrangement 132 separates the plurality of exhaust gases from the carbon dioxide gas. The carbon capture arrangement 132 then discharges the plurality of exhaust gases via a first carbon capture arrangement outlet 180 and discharges the carbon dioxide gas via a second carbon capture arrangement outlet 182.

During use, the dual reboiler arrangement 128, the steam ejector 148, and the flash drum 152 facilitate increasing the amount of power generated by the steam turbine 104. The dual reboiler arrangement 128 and the steam ejector 148 facilitate this power increase by reducing an amount of steam extracted from the steam turbine 104. The flash drum 152 facilitates this power increase by recovering steam used by the carbon capture arrangement 132 and returning the recovered steam to the steam turbine 104.

Further aspects of the invention are provided by the subject matter of the following clauses:

1. A combined cycle (CC) power plant comprising: a steam cycle arrangement comprising a heat recovery steam generator (HRSG) and a steam turbine; said HRSG comprising an HRSG inlet oriented to receive exhaust gases from a gas turbine, and a first HRSG outlet oriented to discharge a first steam flow; and a dual reboiler arrangement comprising a first reboiler and a second reboiler, said first reboiler coupled in flow communication with said first HRSG outlet, said first reboiler configured to receive a circulation flow discharged from the steam turbine and use heat extracted from the circulation flow to heat a solvent circulated by a carbon capture arrangement, said second reboiler oriented to receive a first portion of a discharge liquid flow from the carbon capture arrangement, said second reboiler configured to preheat the first portion using heat extracted from an external flow received from a first external source, and channel the preheated first portion into said first reboiler for use in heating.

2. The CC power plant according to clause 1, wherein said second reboiler is in flow communication with the first external source including at least one of a second HRSG outlet, a treatment hot water source, and a waste heat source.

3. The CC power plant according to any of the preceding clauses, wherein said first reboiler is further configured to receive a second portion of the discharge liquid flow from the carbon capture arrangement.

4. The CC power plant according to any of the preceding clauses, further comprising a steam ejector coupled in flow communication between said first HRSG outlet and said first reboiler, said steam ejector configured to receive a second external source fluid flow, and mix the circulation flow and the second external source fluid flow.

5. The CC power plant according to any of the preceding clauses, further comprising a flash drum coupled in downstream flow communication with said first reboiler, said flash drum configured to recover excess steam from said first reboiler and discharge the recovered excess steam to said steam cycle arrangement.

6. The CC power plant according to any of the preceding clauses, wherein said flash drum is further coupled in downstream flow communication with said second reboiler and is configured to include a portion of recovered excess steam from said second reboiler in the discharge to said steam cycle arrangement.

7. The CC power plant according to any of the preceding clauses, further comprising said carbon capture arrangement configured to capture carbon-based emissions from the gas turbine.

8. A system for improving steam integration of a combined cycle (CC) power plant, the system comprising: a steam cycle arrangement comprising a heat recovery steam generator (HRSG) and a steam turbine; said HRSG comprising an HRSG inlet oriented to receive exhaust gases from a gas turbine, and a first HRSG outlet oriented to discharge a first steam flow; a dual reboiler arrangement comprising a first reboiler and a second reboiler, said first reboiler coupled in flow communication with said first HRSG outlet, said first reboiler configured to receive a circulation flow discharged from the steam turbine and use heat extracted from the circulation flow to heat a solvent circulated by a carbon capture arrangement, said second reboiler oriented to receive a first portion of a discharge liquid flow from the carbon capture arrangement, said second reboiler configured to preheat the first portion using heat extracted from an external flow received from a first external source, and channel the preheated first portion into said first reboiler for use in heating; a steam ejector coupled in flow communication between said first HRSG outlet and said first reboiler, said steam ejector configured to receive a second external source fluid flow, and mix the circulation flow and the second external source fluid flow; and a flash drum coupled in downstream flow communication with said first reboiler, said flash drum configured to recover excess steam from said first reboiler and discharge a portion of the recovered excess steam to said steam cycle arrangement.

9. The system according to the previous clause, wherein the carbon capture arrangement is configured to capture carbon-based emissions from the gas turbine.

10. The system according to any of the preceding clauses, wherein said first reboiler is further configured to receive a second portion of the discharge liquid flow from the carbon capture arrangement and heat the second portion.

At least one of the technical solutions provided by this system to the technical problems may include: (i) reduced efficiency penalties of a power plant system associated with operating a carbon capture process; (ii) increased power production of a power plant system; (iii) reduced amount of steam extracted from a steam turbine of a power plant system; and (iv) increased amount of steam recovered from a carbon capture process and returned to a steam turbine of a power plant system.

The methods described herein may be implemented using a power plant system, wherein the technical effects may be achieved by performing at least one of the following steps: a) receiving exhaust gases from a gas turbine using a heat recovery steam generator (HRSG); b) receiving steam from a steam turbine or from a steam ejector downstream from the steam turbine using a dual reboiler arrangement, the dual reboiler arrangement including a first reboiler and a second reboiler; c) using heat extracted from the steam received by the dual reboiler arrangement to heat a solvent circulated by a carbon capture arrangement; and d) recovering excess steam from the carbon capture arrangement using a flash drum.

The above description is meant to be exemplary only, and one skilled in the art will recognize that changes may be made to the embodiments described without departing from the scope of the invention disclosed. For example, the process steps described herein may be modified in duration, temperature, or time between cycles, for example. Still other modifications, which fall within the scope of the present invention, will be apparent to those skilled in the art, in light of a review of this disclosure, and such modifications are intended to fall within the appended claims.

Exemplary embodiments of a combined cycle power plant are described above in detail. The methods of improving steam integration are not limited to the specific embodiments described herein, but rather, steps of the methods may be utilized independently and separately from other steps described herein. For example, the methods described herein are not limited to practice with combined cycle power plants as described herein. Rather, the exemplary embodiment can be implemented and utilized in connection with many other applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A combined cycle (CC) power plant comprising:
   a steam cycle arrangement comprising a heat recovery steam generator (HRSG) and a steam turbine;
   said HRSG comprising an HRSG inlet oriented to receive exhaust gases from a gas turbine, and a first HRSG outlet oriented to discharge a first steam flow; and
   a dual reboiler arrangement comprising a first reboiler and a second reboiler,
   said first reboiler coupled in flow communication with said first HRSG outlet, said first reboiler configured to receive a circulation flow discharged from the steam turbine and use heat extracted from the circulation flow to heat a solvent circulated by a carbon capture arrangement,
   said second reboiler oriented to receive a first portion of a discharge liquid flow from the carbon capture arrangement, said second reboiler configured to preheat the first portion using heat extracted from an external flow received from a first external source, and channel the preheated first portion into said first reboiler for use in heating.

2. The CC power plant according to claim 1, wherein said second reboiler is in flow communication with the first external source including at least one of a second HRSG outlet, a treatment hot water source, and a waste heat source.

3. The CC power plant according to claim 1, wherein said first reboiler is further configured to receive a second portion of the discharge liquid flow from the carbon capture arrangement.

4. The CC power plant according to claim 1, further comprising a steam ejector coupled in flow communication between said first HRSG outlet and said first reboiler, said steam ejector configured to receive a second external source fluid flow, and mix the circulation flow and the second external source fluid flow.

5. The CC power plant according to claim 1, further comprising a flash drum coupled in downstream flow communication with said first reboiler, said flash drum configured to recover excess steam from said first reboiler and discharge the recovered excess steam to said steam cycle arrangement.

6. The CC power plant according to claim 1, wherein said flash drum is further coupled in downstream flow communication with said second reboiler and is configured to include a portion of recovered excess steam from said second reboiler in the discharge to said steam cycle arrangement.

7. The CC power plant according to claim 1, further comprising said carbon capture arrangement configured to capture carbon-based emissions from the gas turbine.

8. A system for improving steam integration of a combined cycle (CC) power plant, the system comprising:
   a steam cycle arrangement comprising a heat recovery steam generator (HRSG) and a steam turbine;
   said HRSG comprising an HRSG inlet oriented to receive exhaust gases from a gas turbine, and a first HRSG outlet oriented to discharge a first steam flow;
   a dual reboiler arrangement comprising a first reboiler and a second reboiler,
   said first reboiler coupled in flow communication with said first HRSG outlet, said first reboiler configured to receive a circulation flow discharged from the steam turbine and use heat extracted from the circulation flow to heat a solvent circulated by a carbon capture arrangement,
   said second reboiler oriented to receive a first portion of a discharge liquid flow from the carbon capture arrangement, said second reboiler configured to preheat the first portion using heat extracted from an external flow received from a first external source, and channel the preheated first portion into said first reboiler for use in heating;
   a steam ejector coupled in flow communication between said first HRSG outlet and said first reboiler, said steam ejector configured to receive a second external source fluid flow, and mix the circulation flow and the second external source fluid flow; and
   a flash drum coupled in downstream flow communication with said first reboiler, said flash drum configured to recover excess steam from said first reboiler and discharge a portion of the recovered excess steam to said steam cycle arrangement.

9. The system according to claim 8, wherein the carbon capture arrangement is configured to capture carbon-based emissions from the gas turbine.

10. The system according to claim 9, wherein said first reboiler is further configured to receive a second portion of the discharge liquid flow from the carbon capture arrangement and heat the second portion.

* * * * *